United States Patent [19]
Wallace et al.

[11] Patent Number: 5,933,328
[45] Date of Patent: Aug. 3, 1999

[54] COMPACT MECHANISM FOR REMOVABLE INSERTION OF MULTIPLE INTEGRATED CIRCUIT CARDS INTO PORTABLE AND OTHER ELECTRONIC DEVICES

[75] Inventors: Robert F. Wallace, Sunnyvale; Eliyahou Harari, Los Gatos, both of Calif.

[73] Assignee: SanDisk Corporation, Sunnyvale, Calif.

[21] Appl. No.: 09/123,888

[22] Filed: Jul. 28, 1998

[51] Int. Cl.[6] ...................................................... H05K 1/14
[52] U.S. Cl. .......................... 361/737; 361/752; 361/796; 361/803; 361/814; 439/326; 257/678
[58] Field of Search .................................... 361/727, 728, 361/737, 741, 747, 752, 753, 759, 796, 797, 802, 803, 814; 439/326; 235/492; 257/678, 679; 902/26

[56] References Cited

U.S. PATENT DOCUMENTS

| | | |
|---|---|---|
| 5,266,782 | 11/1993 | Alanärä et al. . |
| 5,603,629 | 2/1997 | DeFrasne et al. ...................... 439/331 |
| 5,661,634 | 8/1997 | Obata et al. ............................. 361/684 |
| 5,697,802 | 12/1997 | Kawabe ................... 439/326 |
| 5,813,878 | 9/1998 | Kuwata et al. .......................... 439/326 |
| 5,822,183 | 10/1998 | Kanda et al. ............................. 361/684 |
| 5,831,256 | 11/1998 | De Larminat et al. ................. 235/486 |
| 5,839,913 | 11/1998 | Fumikura ................................. 439/326 |

*Primary Examiner*—Leo P. Picard
*Assistant Examiner*—Jayprakash N. Gandhi
*Attorney, Agent, or Firm*—Majestic, Parsons, Siebert & Hsue

[57] ABSTRACT

Two integrated circuit cards, such as those having semiconductor memory for storing user identification codes and/or data, are removably inserted into an opening of a host electronic device by means of a carrier that causes electrical contacts of the cards to be properly aligned with mating device contacts within the opening. The carrier described is hinged in the opening so that at least one of the cards is removably inserted into the carrier by hand when the carrier is swung out of the opening. In one embodiment, both cards are inserted into the carrier. When the carrier is swung into the opening, the cards are electrically connected with the device. Multiple cards held in this manner take up little more space in the electronic device than a single card currently used. This compact, easy to use connector mechanism is particularly advantageous for cellular telephones, palm organizers and computers, and other small hand held, battery powered, portable electronic devices but also finds application in other electronic equipment as well.

10 Claims, 6 Drawing Sheets

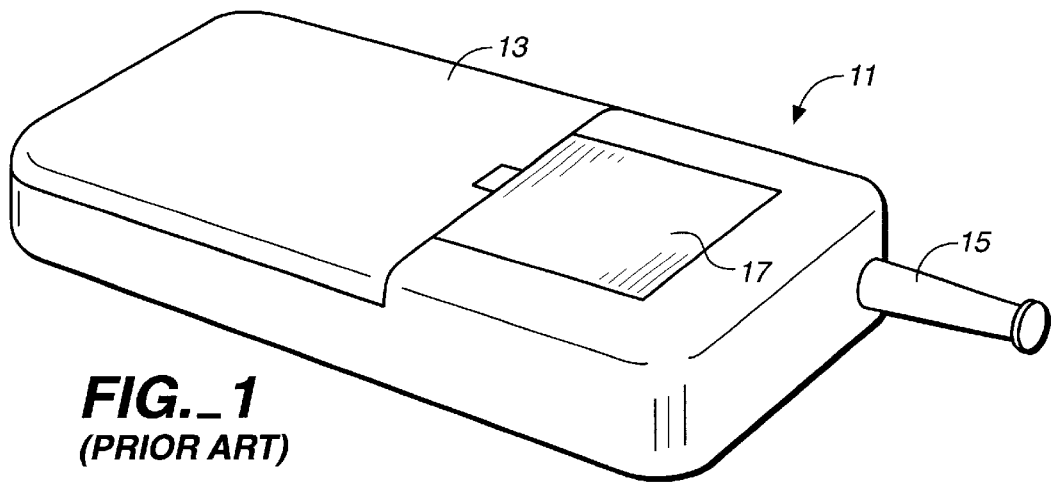
FIG._1
*(PRIOR ART)*
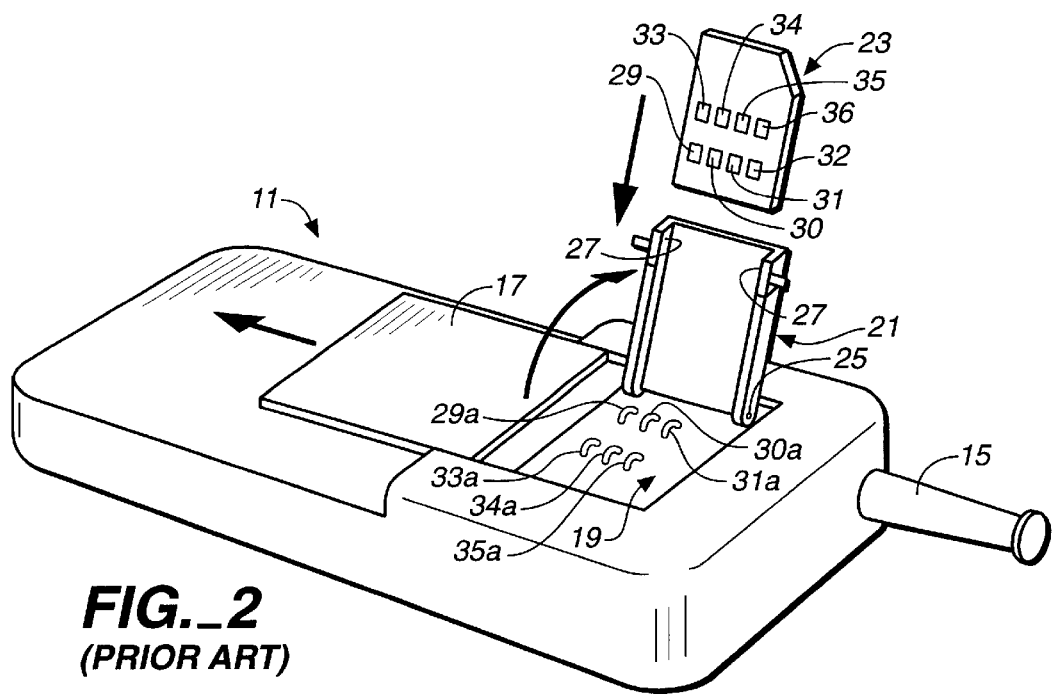
FIG._2
*(PRIOR ART)*
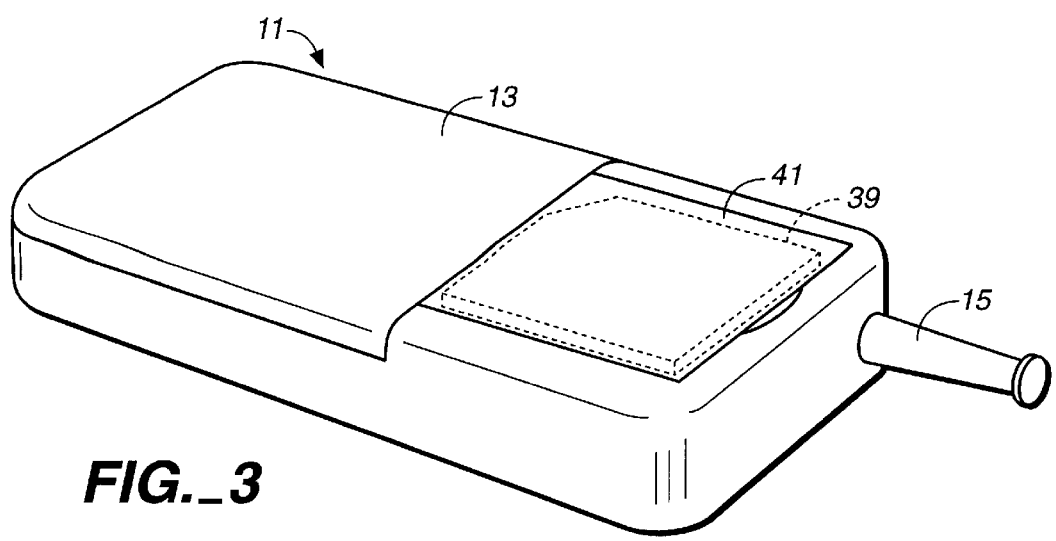
FIG._3

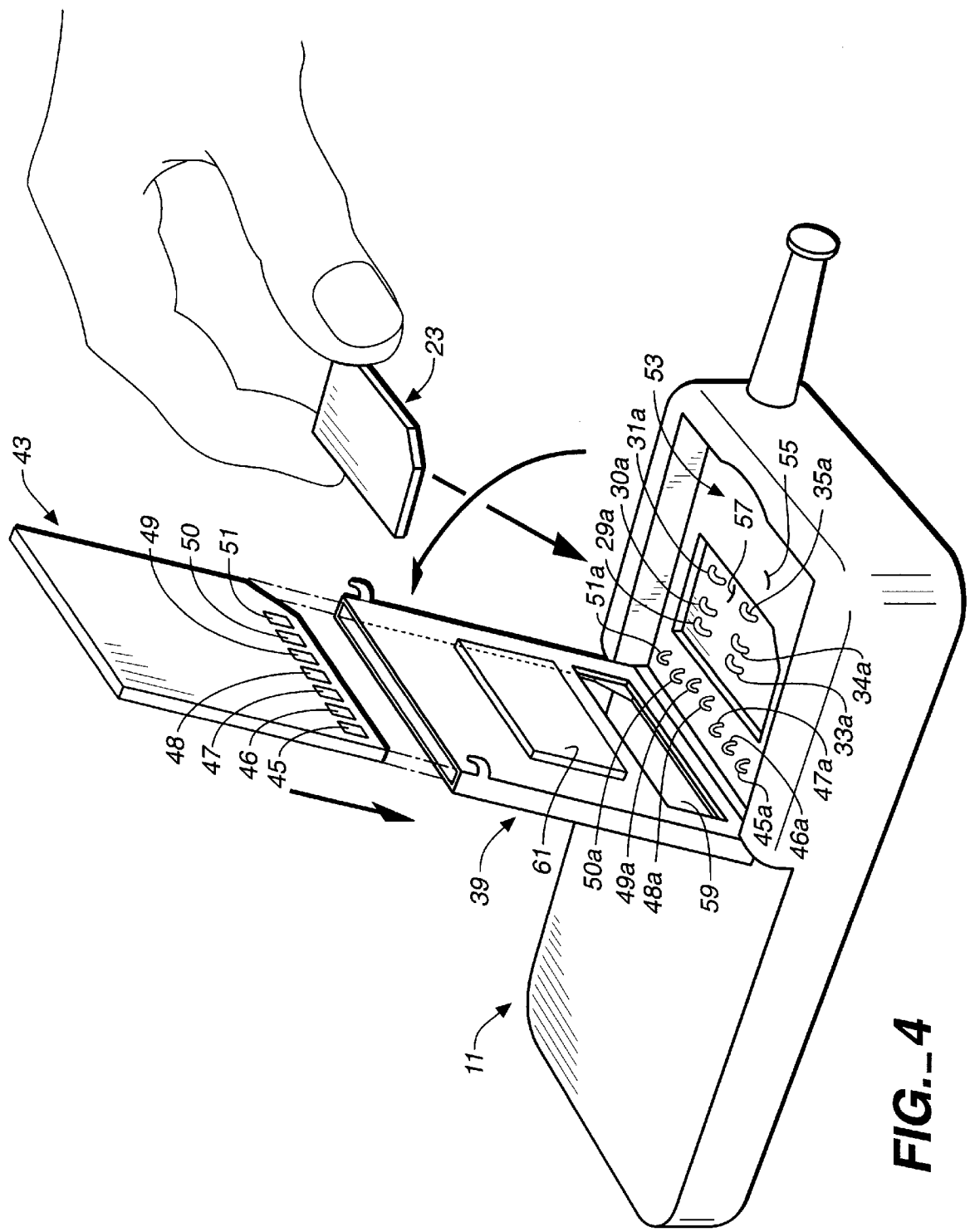
FIG._4

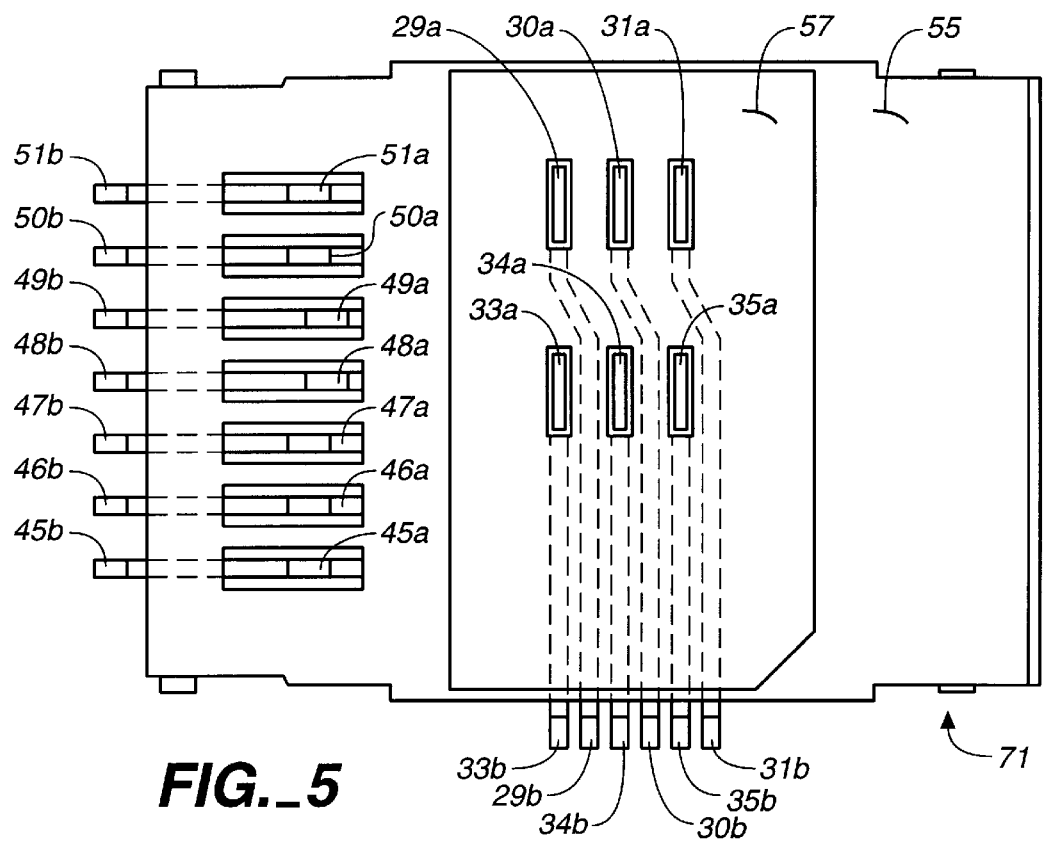
FIG._5
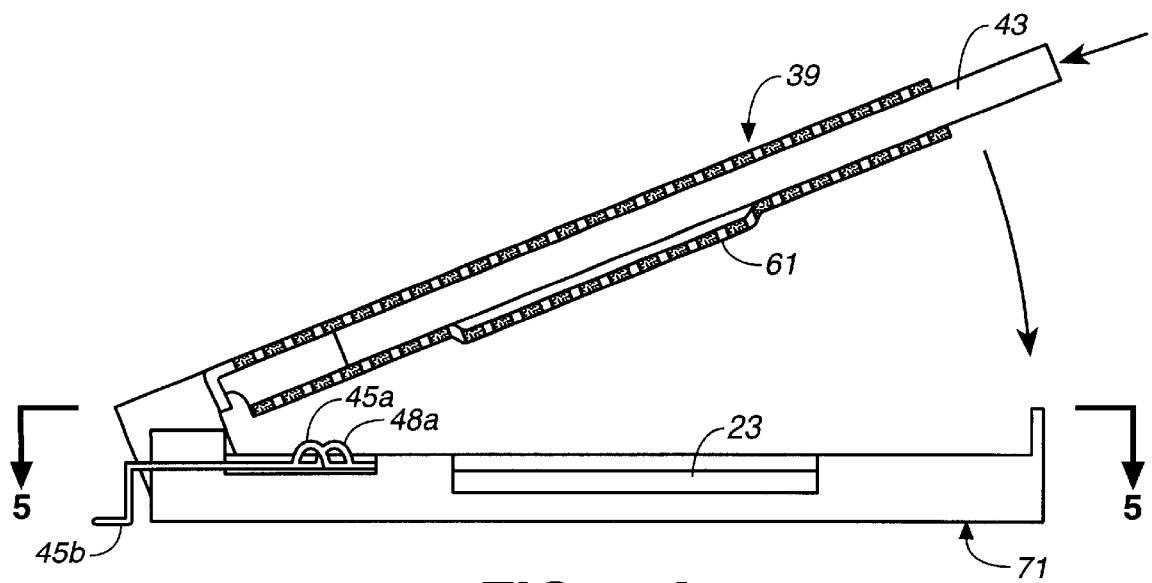
FIG._7A

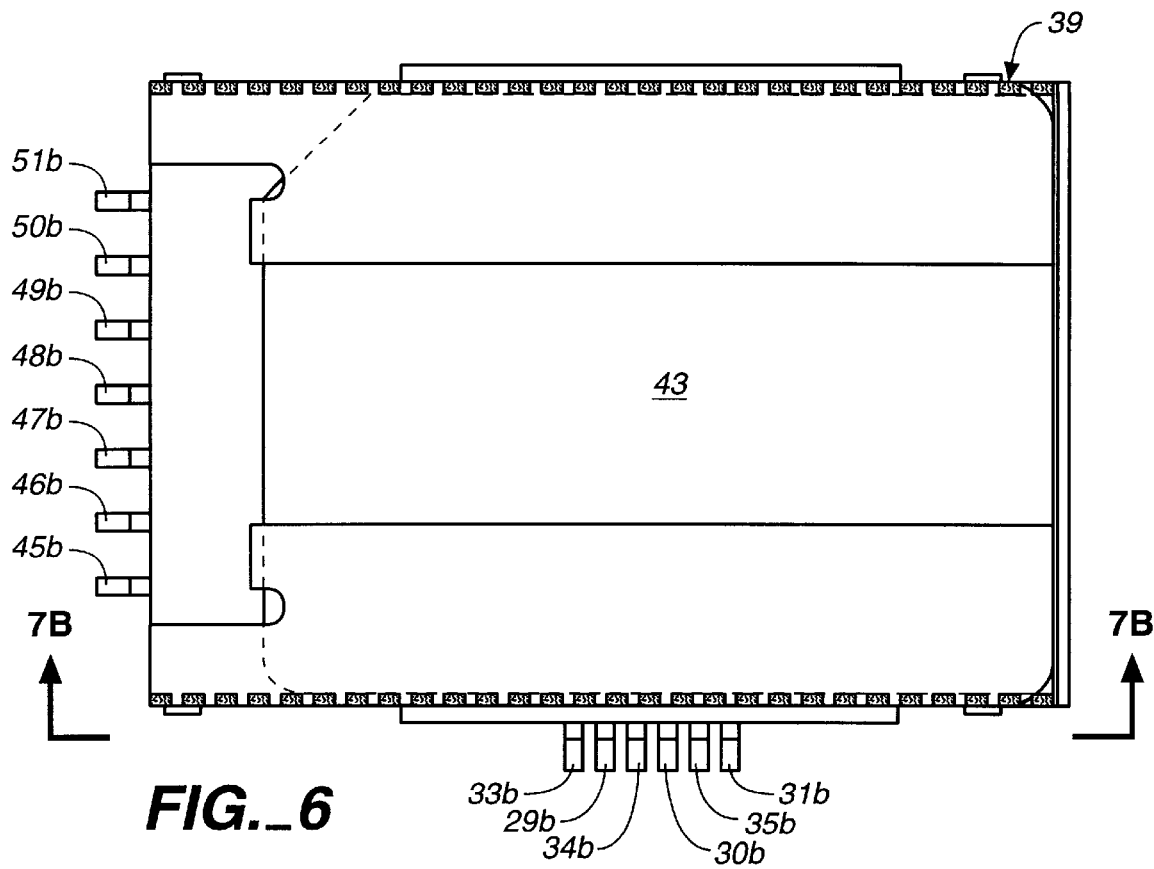
FIG._6
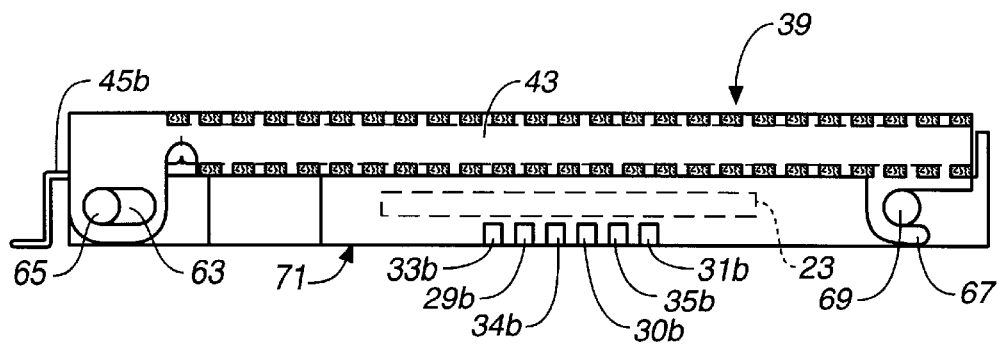
FIG._7B

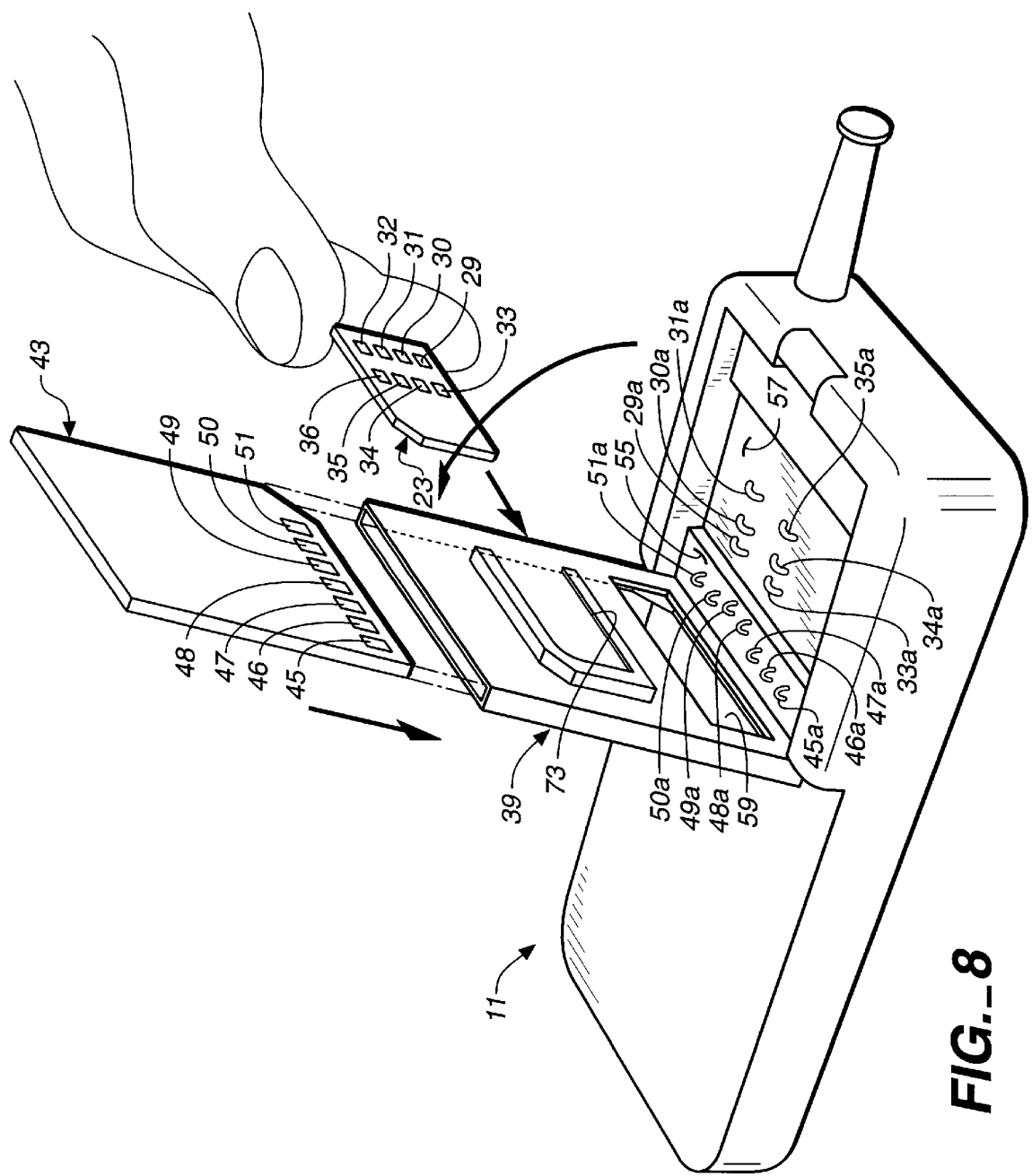
FIG._8

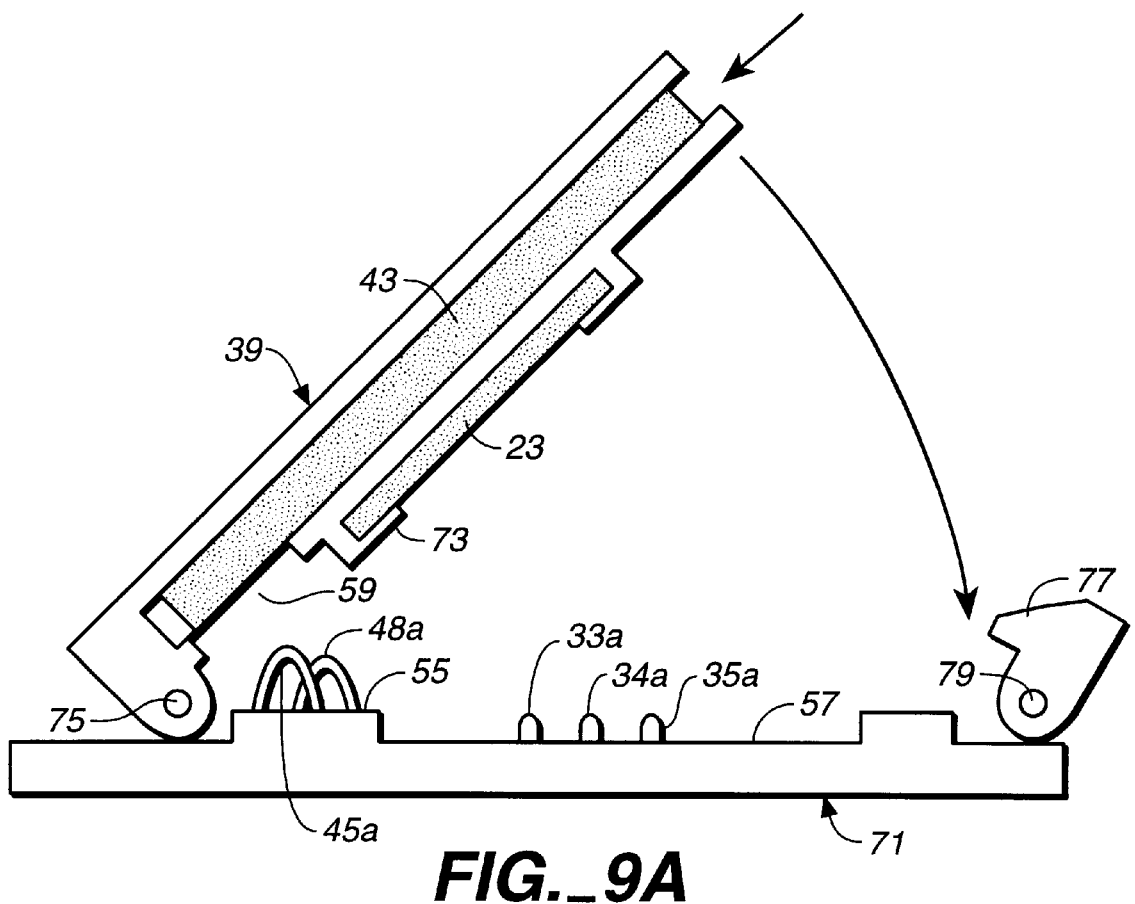
FIG._9A
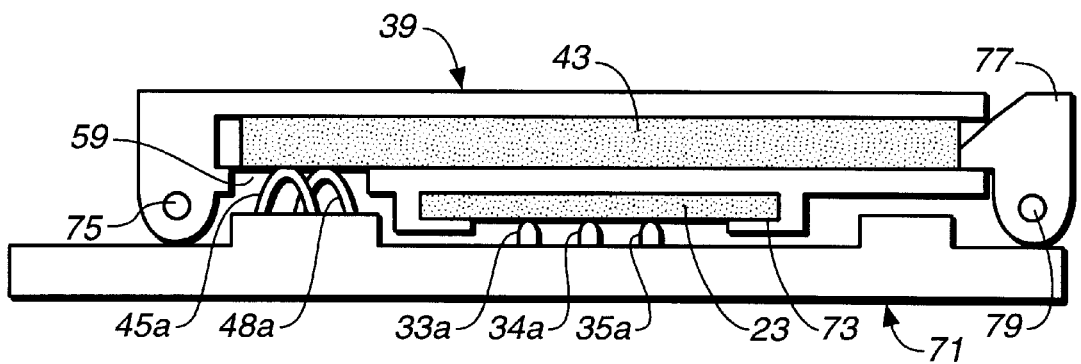
FIG._9B

COMPACT MECHANISM FOR REMOVABLE INSERTION OF MULTIPLE INTEGRATED CIRCUIT CARDS INTO PORTABLE AND OTHER ELECTRONIC DEVICES

BACKGROUND OF THE INVENTION

This invention relates to the use of integrated circuit cards, and other types of electronic modules, that are removably connected with electronic devices by hand, and, more specifically, to connectors within the electronic devices that hold the modules with an electrical connection with the devices.

A card containing an integrated circuit chip is provided with certain types of electronic devices so that the card can be exchanged among two or more devices, or be used with a single device by allowing removal of the card from the device for configuration or programming of its integrated circuit. The integrated circuit cards are used to provide functionality to the electronic device, provide memory capacity for the device, and the like. A mechanism that is part of the electronic device holds the card with mating electrical contacts held against each other. Although not limited to use with small hand held portable electronic devices that are battery powered, the small size of such cards and low power consumption have resulted in them being commonly used with this class of devices. Examples of such devices include cellular telephones, other types of telephones and radio communication devices, and palm held organizers and computers.

Electronic devices have recently been developed which use two such cards having different configurations and performing different functions. Therefore, it is a primary object of the present invention to provide a connector for electronic devices that easily allows two or more small circuit cards to be removably inserted into the device but while consuming a minimum amount of space within the device.

It is another object of the present invention to provide such a connector that easily and assuredly causes each card to become electrically connected with the host electronic device when positioned into the connector.

SUMMARY OF THE INVENTION

These and other objects are accomplished by the present invention, wherein, briefly and generally, parallel surfaces are provided within the case of the electronic device that each contain spring loaded contacts in patterns matching surface contacts of a respective one of the cards. A connector mechanism is operable between two positions, an opened position that allows the cards to be inserted and removed by hand, and a closed position that urges the cards against their respective surfaces to make electrical contact with the device.

According to a more specific aspect of the invention, a carrier of at least one of two cards is hingedly attached to the case of the electronic device within a recess in the case, while two surfaces carrying contacts in different patterns according to those of the two cards are provided at different levels within the recess. When the carrier is rotated out of the recess, the two cards can be inserted or removed by hand. When the carrier is rotated into the recess, the cards are urged against their respective surfaces within the recess. In one embodiment, both cards are inserted into the carrier. In another embodiment, one of the cards is laid within the recess against its surface and then urged thereagainst when the carrier holding the second card is rotated into the recess.

Additional objects, advantages and features of the present invention will become apparent from the following description of its preferred embodiments and comparison with the prior art, which description should be taken in conjunction with the accompanying drawings.

BRIEF DESCRIPTION OF THE DRAWINGS

FIG. 1 is a perspective view of a hand held telephone that is currently available;

FIG. 2 is a perspective view of the telephone of FIG. 1 with a compartment opened to show insertion of a single integrated circuit card into the compartment;

FIG. 3 is a perspective view of a hand held telephone containing an improved compartment containing two integrated circuit cards or data storage modules, with the compartment closed;

FIG. 4 is a perspective view of a first embodiment of a two card receiving mechanism of the telephone of FIG. 3 with its card containing compartment opened to allow the cards to be inserted or removed;

FIG. 5 is a top view of the surfaces and contacts within the card receiving compartment in FIG. 4, with the carrier removed;

FIG. 6 is a top view of the carrier when frilly rotated into the compartment of FIG. 4;

FIG. 7A is a side view of the card carrier and bottom surfaces of the compartment of FIG. 4, and two cards, with the carrier partially opened out of the compartment;

FIG. 7B is side view of the card carrier and bottom surfaces of the compartment of FIG. 4, and two cards, with the carrier rotated into the compartment in a closed position;

FIG. 8 is a perspective view of a second embodiment of a two card receiving mechanism of the telephone of FIG. 3 with its card containing compartment opened to allow the cards to be inserted or removed;

FIG. 9A is a side view of the card carrier and bottom surfaces of the compartment of FIG. 8, and two cards, with the carrier partially opened out of the compartment; and FIG. 9B is side view of the card carrier and bottom surfaces of the compartment of FIG. 8, and two cards, with the carrier rotated into the compartment in a closed position.

DESCRIPTION OF A PRIOR ART DEVICE

An existing cellular telephone 11 is shown in FIGS. 1 and 2, as background. The telephone has the usual removable battery 13 and antenna 15. A cover 17 is removable to expose an opening 19 that is recessed into the cover of the telephone. A carrier 21 for an integrated circuit card 23 is attached within the opening by a hinge 25. The card 23 is held by the carrier in a slot 27. The card 23 is manually slid into the slot 27, or removed from it, by hand when the carrier 21 is opened out of the opening 19, as shown in FIG. 2. When the carrier 21 is rotated into the opening 19, the cover 17 is closed over the opening to render it useable.

The card 23 of the telephone being described includes a memory integrated circuit chip for storing data of the user of the telephone, including security and billing codes, and the like. It is termed a single in-line memory module (SIMM). The card is very thin, about one millimeter in thickness, with smooth opposing sides. On one of the sides are two rows of metallic contacts 29–32 and 33–36 that connect with the circuit inside the card. Spring loaded contacts 29a–31a and 33a–35a are provided in a bottom surface of the opening 19, in the same pattern as contacts 29–31 and 33–35 of the card 23, respectively. Therefore, these contacts of the card 23 are urged against corresponding ones of the spring loaded contacts in the opening 19 when the carrier 21 is pivoted into the opening 19 to a closed position. In this position, the surface of the card 23 containing the contacts is urged against the bottom surface of the opening 19, with the contacts 29a–31a and 33a–35a pushed against their resilient loading into slots within the bottom surface of the telephone case recess. No contacts are shown within the opening 19 for engaging the card contacts 32 and 36 since these are optionally provided to detect when a SIMM card is in place.

DESCRIPTION OF THE PREFERRED EMBODIMENTS

With increased capabilities being provided in portable electronic devices, use of a second card has been proposed. In the case of a cellular telephone, a non-volatile memory card using flash electrically erasable and programmable read-only-memory (EEPROM) can store the entire telephone book of a number of cities, serve to store voice mail messages, and provide other memory intensive functions. A new standard for such cards is a multi-media card (MMC). Use of a second card allows use of the SIMM card to continue without significant change. The techniques of the present invention provide for connecting both the MMC and SIMM cards to a host electronic device without becoming excessively complicated or requiring much more space. Some additional space is required, however, since the MMC card is larger than the SIMM card. Alternatively, other types of data storage modules, such as those utilizing dynamic random access memory (DRAM) or read only memory (ROM), may be connected in this manner.

FIG. 3 illustrates a cellular telephone in which either of the improved connector mechanisms of FIGS. 4–7 or 8–9 is implemented. The telephone of FIG. 3 is the same as that of FIGS. 1 and 2, except for the connector mechanism that allows use of both the SIMM and MMC cards. In each of the two embodiments, a slightly larger hinged carrier 39 is contained under a slightly enlarged cover 41 of the telephone case. Elements of the embodiments of FIGS. 3–9 that are the same or nearly the same as elements in the prior art telephone of FIGS. 1 and 2 are given the same reference numbers.

In the embodiment of FIGS. 4–7, as best initially seen from the perspective view of FIG. 4, the carrier 39 receives a MMC card 43 while the SIMM card 23 is laid into the bottom of a recessed opening 53. The MMC card 43 is similarly very thin, in the order of one millimeter, and contains one row of electrical contacts 45–51 near one edge. The opening 53 has a bottom formed of two surfaces 55 and 57 that are parallel to each other. The upper surface contains a row of spring loaded contacts 45a–51a in a pattern to match that of the MMC card 43 contacts 45–51. Those corresponding contacts meet each other through an opening 59 of a bottom surface of the carrier 39 when the carrier is rotated into the opening 55 in a closed position. The lower surface 57 is shaped with an extent slightly larger than that of the SIMM card 23 and includes the resilient contacts 29a–33a. The SIMM card 23 is laid into the recess of the bottom surface 57, and is urged downward against the resilient contacts 29a–33a when the carrier 39 is closed by a resilient surface 61 on the bottom of the carrier 39.

By this design, the two cards are easily inserted and removed by hand from the cellular telephone I 1. After insertion of the two cards in the manner shown in FIG. 4, the carrier 39 is simply rotated into the opening 53 and the cover 41 replaced over it. The MMC and SIMM cards are then firmly positioned against respective surfaces 55 and 57 to make good electrical contact with their spring loaded contacts. The space required for this connector mechanism across the cover of the telephone is little more than that of the largest of the two cards, here the MMC card 43.

The carrier 39 is preferably locked into place when rotated into the opening 53, as best shown by FIG. 7B. A hinged connection is formed between the carrier 39 and the telephone case by a slot 63 in the carrier 39 and a post 65 attached to the case within the opening 53. This allows the carrier 39 to be slid back and forth by moving the slot 63 over the post 65. At the free end of the carrier 39 is a opened hook 67 positioned to engage a post 69. The carrier 39 is locked in a closed position, when rotating it into the opening 53, by urging it to the left (FIG. 7B) and then, once the hook 67 is below the post 69, moving the carrier to the right into the position shown in FIG. 7B.

The bottom surfaces 55 and 57, and their respective contacts, are preferably arranged in a manner that is easily integrated into the telephone. FIG. 5 is a plan view those surfaces, preferably formed on the top of a single piece 71. Each of the contacts 29a–31a, 33a–35a and 45a–51a for the SIMM and MMC cards is held within an aperture of the piece 71, and is resiliently urged upwards to normally extend above its respective surface. When the cards are positioned against their respective surfaces 55 and 57, these contacts are pushed back into their apertures, with a resulting force of them against their respective contacts on the cards establishing electrical contact. Conductive traces (shown dashed in FIG. 5) extend under the piece 71 to pins outside of but adjacent to edges of the piece 71. SIMM card contacts 29a–31a and 33a–35a are connected in this way to respective pins 19b–31b and 33b–35b. Similarly, MMC card contacts 45a–51a are connected to respective pins 45b–51b along another edge of the piece. The piece 71 is conveniently mounted on a printed circuit board with these pins contacting conductors on the board.

FIGS. 8 and 9 illustrate a modified version of the connector mechanism described above with respect to FIGS. 4–7, wherein the same or similar elements are identified by the same reference numbers. The primary difference in the embodiment of FIGS. 8 and 9 is that the SIMM card 23 is inserted into the carrier 39, rather than being loosely laid in a recess in the bottom surface. A slot 73 is provided on the underside of the carrier 39 to surround three sides of the SIMM card 23, the card being inserted and removed along through a fourth open side of the slot 73. The carrier 39 is illustrated in FIG. 9A to have both of the cards 23 and 43 therein. When the carrier 39 is moved into its closed position, contacts of the SIMM card 23 held in the carrier 39 are urged against the the spring loaded contacts of the surface 57, as illustrated in FIG. 9B. Contacts of the MMC card 43 also engage the spring loaded contacts of the surface 55 as the carrier 39 is closed, in the same manner as the embodiment of FIGS. 4–7.

In the embodiment of FIGS. 8 and 9, the carrier 39 is attached to the base 71 by a pin 75, about which it rotates. When rotated completely into the card compartment, as shown in FIG. 9B, the carrier is latched in place by a latching element 77 carried by a pin 79 at an opposite end of the carrier 39.

Although the various aspects of the present invention have been described with respect to the preferred embodiments thereof, it will be understood that the invention is entitled to protection within the full scope of the appended claims.

It is claimed:

1. A connector of first and second integrated circuit cards within an enclosure of a host electronic device, comprising:

an opening extending into the electronic device enclosure that accepts said first and second cards, a first surface within the opening that contains a first set of a plurality of electrical contacts positioned thereacross in a pattern corresponding to a pattern of contacts across a broad surface of the first card, wherein said first set of contacts are resiliently urged out of the first surface in a manner to be pushed into the first surface when the first card is positioned thereagainst, and a second surface within the opening that contains a second set of a plurality of electrical contacts positioned thereacross in a pattern corresponding to a pattern of contacts across a broad surface of the second card, wherein said second set of contacts are resiliently urged out of the second surface in a manner to be pushed into the second surface when the second card is positioned thereagainst, whereby both of the first and second cards are simultaneously held within the opening of the host electronic device.

2. The connector of claim 1, wherein said first and second surfaces are parallel with each other, thereby causing the broad surfaces of the first and second cards to be parallel with each other.

3. The connector of claim 1, wherein the connector is positioned within a battery powered portable host electronic device.

4. The connector of claim 1, additionally comprising means operated by hand for removably inserting said first and second cards into the opening in a manner to cause electrical contact to be made between the first and second cards and respective contacts of the first and second surfaces.

5. The connector of claim 1, additionally comprising a carrier positionable within the enclosure opening and adapted to hold at least one of the first and second cards.

6. The connector of claim 5, wherein said carrier is affixed to the host device enclosure by a hinge connection along one side thereof within the enclosure opening in a manner to be rotated between a first position out of the opening to accept said at least one of the first and second cards and a second position within the enclosure opening with said at least one of the first and second cards positioned against its respective first or second surface.

7. The connector of claim 1, additionally comprising a carrier positionable within the enclosure opening and adapted to hold both of said first and second cards.

8. The connector of claim 7, wherein said carrier is affixed to the host device enclosure by a hinge connection along one side thereof within the enclosure opening in a manner to be rotated between a first position out of the opening to accept said first and second cards and a second position within the enclosure opening where both of said first and second cards are positioned against their respective first and second surfaces.

9. A mechanism for connecting first and second integrated circuit cards with a host electronic device within an enclosure, comprising:

an opening extending into the electronic device enclosure over an area of the enclosure sufficient to accept a broad surface of the first card, said opening extending a first depth to first surface extending over an area sufficient to accept a broad surface of the second card, the first surface being surrounded by a second surface extending into the opening a second depth that is less than the first depth, a first set of a plurality electrical contacts positioned across the first surface in a pattern corresponding to contacts on a broad surface of the second card, wherein said first set of contacts are resiliently urged out of the first surface in a manner to be pushed into the first surface when the second card is positioned against the first surface, a second set of a plurality electrical contacts positioned across the second surface in a pattern corresponding to contacts on a broad surface of the first card, wherein said second set of contacts are resiliently urged out of the second surface in a manner to be pushed into the second surface when the first card is positioned against the second surface, and a carrier that accepts the first card being hingedly connected along one side thereof to the device enclosure within said opening in a manner to permit the first card to be inserted into or removed from the carrier by hand when pivoted out of the opening and with the second card having its contacts held against the first set of contacts when the carrier is pivoted into the opening to a position against the second surface, said carrier additionally including a surface on one side thereof that resiliently urges the second card against the first surface, whereby both of said first and second cards are compactly removably held within the opening in electrical contact with the host electronic device.

10. A mechanism for connecting first and second integrated circuit cards with a host electronic device within an enclosure, comprising:

an opening extending into the electronic device enclosure over an area of the enclosure sufficient to accept a broad surface of the first card, a first set of a plurality electrical contacts positioned within the opening in a pattern corresponding to contacts on a broad surface of the first card, wherein said first set of contacts are resiliently held in a manner to be pushed against their resilience when the first card is positioned against the first set of contacts, a second set of a plurality electrical contacts positioned within the opening in a pattern corresponding to contacts on a broad surface of the second card, wherein said second set of contacts are resiliently held in a manner to be pushed against their resilience when the second card is positioned against the second set of contacts, and a carrier that accepts both the first and second cards being hingedly connected along one side thereof to the device enclosure within said opening in a manner to permit the first and second cards to be inserted into or removed from the carrier by hand when pivoted out of the opening and with the first and second cards having their contacts held respectively against the first and second set of contacts when the carrier is pivoted into the opening about the hinge, whereby both said first and second cards are compactly removably held within the opening in electrical contact with the host electronic device.

* * * * *